United States Patent
Kim et al.

(10) Patent No.: US 9,934,440 B1
(45) Date of Patent: Apr. 3, 2018

(54) METHOD FOR MONITORING BLIND SPOT OF MONITORING VEHICLE AND BLIND SPOT MONITOR USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/724,544

(22) Filed: Oct. 4, 2017

(51) Int. Cl.
| | |
|---|---|
| *G06K 9/00* | (2006.01) |
| *G06K 9/20* | (2006.01) |
| *G06K 9/78* | (2006.01) |
| *G06K 9/48* | (2006.01) |
| *G06K 9/62* | (2006.01) |
| *G06N 3/08* | (2006.01) |

(Continued)

(52) U.S. Cl.
CPC ....... *G06K 9/00791* (2013.01); *G06K 9/2054* (2013.01); *G06K 9/481* (2013.01); *G06K 9/6256* (2013.01); *G06K 9/6267* (2013.01); *G06K 9/78* (2013.01); *G06N 3/04* (2013.01); *G06N 3/08* (2013.01); *B60R 1/00* (2013.01); *B60R 2300/802* (2013.01); *B60Y 2400/3015* (2013.01); *G06K 2209/21* (2013.01)

(58) Field of Classification Search
None
See application file for complete search history.

(56) References Cited

U.S. PATENT DOCUMENTS

| | | | | |
|---|---|---|---|---|
| 2011/0242318 | A1* | 10/2011 | Lee | B60Q 9/008 348/148 |
| 2015/0042815 | A1* | 2/2015 | Park | H04N 7/181 348/159 |

(Continued)

*Primary Examiner* — Delomia L Gilliard
(74) *Attorney, Agent, or Firm* — Husch Blackwell LLP (57) ABSTRACT

A method of monitoring a blind spot of a monitoring vehicle by using a blind spot monitor. The method includes steps of: the blind spot monitor (a) acquiring a feature map from rear video images, on condition that video images with reference vehicles in the blind spot are acquired, reference boxes for the reference vehicles are created, and the reference boxes are set as proposal boxes; (b) acquiring feature vectors for the proposal boxes on the feature map by pooling, inputting the feature vectors into a fully connected layer, acquiring classification and regression information; and (c) selecting proposal boxes by referring to the classification information, acquiring bounding boxes for the proposal boxes by using the regression information, confirming whether the bounding boxes match their corresponding proposal boxes, and determining whether the monitored vehicle is in the proposal boxes to determine the monitored vehicle is in the blind spot.

22 Claims, 6 Drawing Sheets

(51) Int. Cl.
*G06N 3/04* (2006.01)
*B60R 1/00* (2006.01)

(56) References Cited

U.S. PATENT DOCUMENTS

2017/0287168 A1* 10/2017 Jeong .................... G06T 3/4038
2017/0294128 A1* 10/2017 Lai ........................ G08G 1/167

* cited by examiner

METHOD FOR MONITORING BLIND SPOT OF MONITORING VEHICLE AND BLIND SPOT MONITOR USING THE SAME

FIELD OF THE INVENTION

The present invention relates to a method for monitoring a blind spot of a monitoring vehicle and a blind spot monitor using the same; and more particularly, to the method of monitoring a blind spot of a monitoring vehicle, including steps of: (a) the blind spot monitor, if rear video images for testing are acquired from the monitoring vehicle in operation, acquiring at least one feature map for testing from the rear video images for testing, on condition that the blind spot monitor completes processes of (i) acquiring rear video images for sampling with regard to one or more reference vehicles located per distance from the monitoring vehicle and located in the blind spot of the monitoring vehicle, (ii) creating reference boxes corresponding to the reference vehicles in each of the rear video images for sampling, and (iii) setting the reference boxes as m proposal boxes which serve as candidate regions in the blind spot of the monitoring vehicle, wherein the candidate regions have probabilities of detecting at least one monitored vehicle; (b) the blind spot monitor (i) acquiring each of feature vectors for testing corresponding to each of the m proposal boxes by applying pooling operation to the m proposal boxes on the feature map for testing, (ii) inputting the feature vectors for testing into at least one fully connected layer, (iii) acquiring classification scores for testing for each class, corresponding to each of the m proposal boxes, and (iv) acquiring regression information for testing for each class, corresponding to each of the m proposal boxes; and (c) the blind spot monitor performing processes of (i) selecting j proposal boxes among the m proposal boxes by referring to the classification scores for testing, (ii) acquiring bounding boxes each of which is corresponding to each of the j proposal boxes by using the regression information for testing corresponding to each of the j proposal boxes, (iii) confirming whether each of the bounding boxes matches its corresponding proposal box among the j proposal boxes to a degree equal to or greater than a first threshold, and (iv) determining whether the monitored vehicle is located in each of the j proposal boxes, to thereby determine whether the monitored vehicle is located in the blind spot of the monitoring vehicle; and the blind spot monitor using the same.

BACKGROUND OF THE INVENTION

A monitoring vehicle has a side view mirror for each side thereof and a rear-view mirror at the front center of its cabin for a good field of view of the side and the rear needed for change of lanes by a driver.

Although the side view mirror is used for seeing each side and the rear thereof, it has a blind spot (BS) where the driver cannot see a monitored vehicle or any other objects that are very close thereto.

This has been a problem because there can be an accident with the monitored vehicle in the blind spot if the driver changes lanes without seeing the monitored vehicle.

To prevent such a problem, the driver sometimes put a convex mirror onto a corner of the side view mirror, which enables the driver to see the blind spot.

However, even when the convex mirror is added onto the side view mirror, the driver must see the blind spot with his/her own eyes to change lanes which puts further strain to the driver, and there may exist the blind spot that still cannot be seen through the convex mirror even if the driver alters his/her head position.

To prevent this, a blind spot monitoring system is suggested recently that aims to prevent accidents from happening when the driver changes lanes without noticing the monitored vehicle in the blind spot, by providing the driver with information on a detection of the monitored vehicle, that is located in the blind spot or approaching the blind spot, through a sensor placed at the rear of the monitoring vehicle.

Especially, blind spot monitoring systems using a vision sensor generally adopt algorithms capable of detecting several characteristics based on visual information.

However, those algorithms may show limited detection rates constrained by external environment, shape of the objects, and a configuration of a system. Because an accurate detection requires a number of visual processing, a computational load is very heavy. Therefore, real-time detection may be difficult in an embedded system due to limited processing resources.

One of the major issues in a convolutional neural network (CNN) that causes a slow speed is a region proposal network (RPN). To extract a candidate from a final feature map, the RPN determines whether a sliding window includes a candidate in each and every location. A fully connected (FC) determines whether the candidate is a vehicle, however, many of the candidates overlap each other and the RPN consumes much running time performing computation on these redundant candidates which hardly help improve a detection rate.

As another example of detecting the monitored vehicle using a vision sensor, there is an optical flow method which expresses movement of a visual pixel by a motion vector. However, an algorithm for recognition of the monitored vehicle using the optical flow method has much dependence on a change of a state of a background and a visual noise, and requires an enormous computational load, therefore, real-time detection of the monitored vehicle is not easy.

SUMMARY OF THE INVENTION

It is an object of the present invention to solve all the aforementioned problems.

It is another object of the present invention to detect a monitored vehicle located in a blind spot with ease.

It is still another object of the present invention to detect the monitored vehicle located in the blind spot without regard to driving environment.

It is still yet another object of the present invention to provide an algorithm which requires smaller computation for detection of the monitored vehicle located in the blind spot.

It is still yet another object of the present invention to detect the monitored vehicle located in the blind spot in real-time without regard to a change of a state of a background and visual noise.

It is still yet another object of the present invention to detect the monitored vehicle located in the blind spot accurately using a CNN.

In accordance with one aspect of the present invention, there is provided a method of monitoring a blind spot of a monitoring vehicle by using a blind spot monitor, including steps of: (a) the blind spot monitor, if rear video images for testing are acquired from the monitoring vehicle in operation, acquiring or supporting another device to acquire at least one feature map for testing from the rear video images for testing, on condition that the blind spot monitor completes or supports another device to complete processes of (i) acquiring rear video images for sampling with regard to one or more reference vehicles located per distance from the monitoring vehicle and located in the blind spot of the monitoring vehicle, (ii) creating reference boxes corresponding to the reference vehicles in each of the rear video images for sampling, and (iii) setting the reference boxes as m proposal boxes which serve as candidate regions in the blind spot of the monitoring vehicle, wherein the candidate regions have probabilities of detecting at least one monitored vehicle; (b) the blind spot monitor (i) acquiring or supporting another device to acquire each of feature vectors for testing corresponding to each of the m proposal boxes by applying pooling operation to the m proposal boxes on the feature map for testing, (ii) inputting or supporting another device to input the feature vectors for testing into at least one fully connected layer, (iii) acquiring or supporting another device to acquire classification scores for testing for each class, corresponding to each of the m proposal boxes, and (iv) acquiring or supporting another device to acquire regression information for testing for each class, corresponding to each of the m proposal boxes; and (c) the blind spot monitor performing or supporting another device to perform processes of (i) selecting j proposal boxes among the m proposal boxes by referring to the classification scores for testing, (ii) acquiring each of bounding boxes corresponding to each of the j proposal boxes by using the regression information for testing corresponding to each of the j proposal boxes, (iii) confirming whether each of the bounding boxes matches its corresponding proposal box among the j proposal boxes to a degree equal to or greater than a first threshold, and (iv) determining whether the monitored vehicle is located in any of the j proposal boxes, to thereby determine whether the monitored vehicle is located in the blind spot of the monitoring vehicle.

In accordance with another aspect of the present invention, there is provided a blind spot monitor for monitoring a blind spot of a monitoring vehicle, including: a communication part for acquiring or supporting another device to acquire rear video images for testing from the monitoring vehicle being driven, on condition that rear video images for sampling taken from the monitoring vehicle with regard to one or more reference vehicles located per distance from the monitoring vehicle and located in the blind spot of the monitoring vehicle are acquired, that reference boxes corresponding to the reference vehicles in each of the rear video images for sampling are created, and that the reference boxes are set as m proposal boxes which serve as candidate regions in the blind spot of the monitoring vehicle, wherein the candidate regions have probabilities of detecting at least one monitored vehicle; and a processor for performing or supporting another device to perform processes of (i) acquiring a feature map for testing from the rear video images for testing; (ii) acquiring feature vectors for testing corresponding to each of the m proposal boxes by applying pooling operation to each of areas corresponding to the m proposal boxes on the feature map for testing, inputting the feature vectors for testing corresponding to each of the m proposal boxes into at least one fully connected layer, and (ii-1) acquiring classification scores for testing for each class, corresponding to each of the m proposal boxes, (ii-2) acquiring regression information for testing for each class, corresponding to each of the m proposal boxes; and (iii) selecting j proposal boxes among the m proposal boxes by referring to the classification scores for testing, acquiring bounding boxes corresponding to each of the j proposal boxes by using the regression information for testing corresponding to each of the j proposal boxes, confirming whether each of the bounding boxes matches its corresponding proposal box among the j proposal boxes to a degree equal to or greater than a first threshold, and determining whether the monitored vehicle is located in any of the j proposal boxes, to thereby determine whether the monitored vehicle is located in the blind spot of the monitoring vehicle.

In addition, recordable media that are readable by a computer for storing a computer program to execute the method of the present invention is further provided.

BRIEF DESCRIPTION OF THE DRAWINGS

The following drawings to be used to explain example embodiments of the present invention are only part of example embodiments of the present invention and other drawings can be obtained based on the drawings by those skilled in the art of the present invention without inventive work.

DETAILED DESCRIPTION OF THE PREFERRED EMBODIMENTS

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 1:
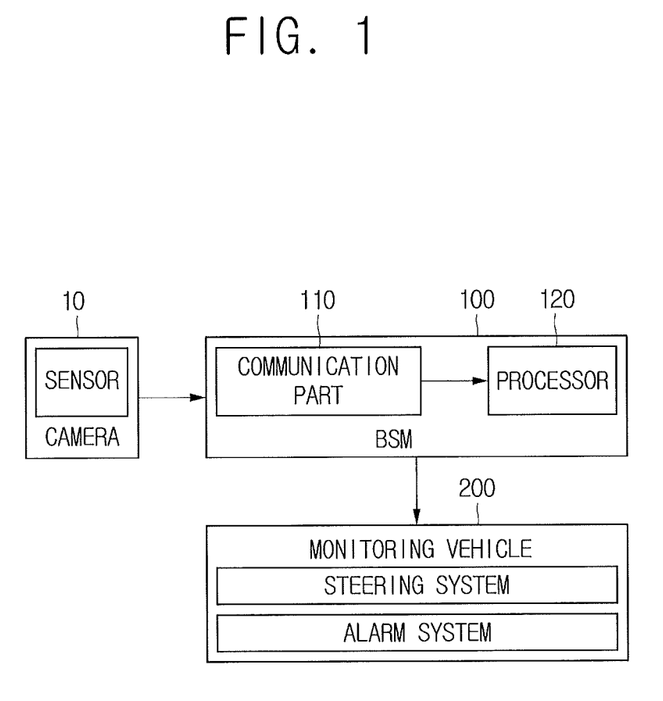
FIG. 1 is a block diagram schematically illustrating a blind spot monitoring system in accordance with one example embodiment of the present invention.

First of all, FIG. 1 is a block diagram schematically illustrating a blind spot monitoring system in accordance with one example embodiment of the present invention. By referring to FIG. 1, the blind spot monitoring system may include a blind spot monitor (BSM) 100 and a monitoring vehicle 200.

The blind spot monitor 100 may detect another vehicle, i.e., a monitored vehicle, located in a blind spot of the monitoring vehicle or approaching the blind spot. In detail, the blind spot monitor 100 may determine whether the monitored vehicle is located in the blind spot by analyzing rear video images acquired from the monitoring vehicle using a vision sensor 10, e.g., a camera.

Then, the monitoring vehicle 200 may be prevented from changing lanes in a direction to the blind spot where the monitored vehicle is determined as located, or may allow an alarm system to warn a driver of a fact that the monitored vehicle is in the blind spot, by referring to information on a steering system and information transmitted from the blind spot monitor 100. Especially, in case the monitoring vehicle 200 is an autonomous vehicle, it may determine whether to change lanes while driving by referring to information on driving environment and information on the monitored vehicle in the blind spot received from the blind spot monitor 100.

Figure 2:
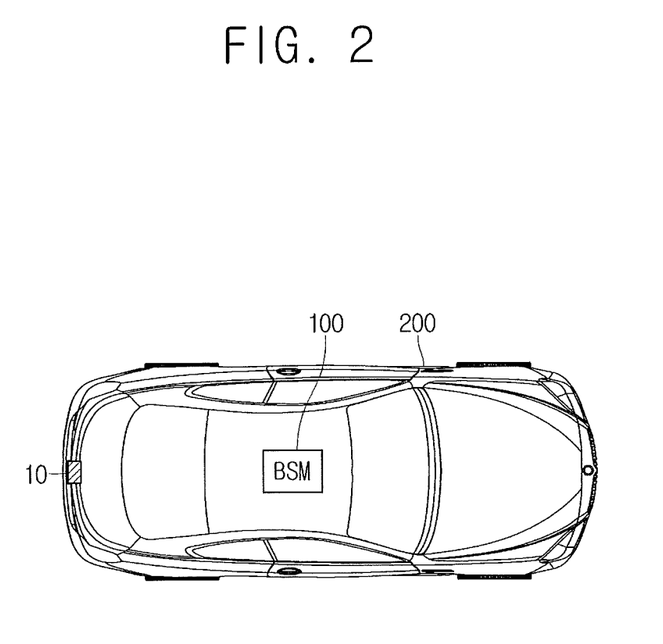
FIG. 2 is a diagram schematically illustrating the blind spot monitoring system on a monitoring vehicle in accordance with one example embodiment of the present invention.

Further, the blind spot monitor 100 may include a communication part 110 that acquires the rear video images from the monitoring vehicle using the vision sensor 10 and a processor 120 that determines whether the monitored vehicle is in the blind spot of the monitoring vehicle by analyzing the acquired rear video images. Herein, the vision sensor 10, installed on an arbitrary place of the monitoring vehicle 200, may capture video of a rear view thereof, as can be seen in FIG. 2, and may include an optical sensor, e.g., a charge-coupled device (CCD), complementary metal-oxide-semiconductor (CMOS), or an image capturing device.

Further, the processor 120 may perform processes of (i) acquiring at least one feature map from the acquired rear video images, (ii) applying pooling operation to each of areas on the feature map corresponding to each of m proposal boxes, and (iii) acquiring feature vectors, each of which corresponds to each of the m proposal boxes. Herein, m may be a predetermined value. Then, the processor 120 may perform processes of (i) inputting the feature vectors into at least one fully connected (FC) layer, (ii) acquiring classification scores for each class, corresponding to each of the m proposal boxes, and (iii) acquiring regression information for each class, corresponding to each of the m proposal boxes. Thereafter, the processor 120 may perform processes of (i) selecting j proposal boxes which are determined to have the monitored vehicle, among the m proposal boxes, by referring to the classification scores, (ii) acquiring each of bounding boxes corresponding to each of the j proposal boxes by using each piece of the regression information corresponding to each of the j proposal boxes, (iii) confirming whether each of the bounding boxes matches its corresponding proposal box among the j proposal boxes to a degree equal to or greater than the first threshold, and accordingly (iv) determining whether the monitored vehicle is located in any of the j proposal boxes. Therefore, information on whether the monitored vehicle is located in the blind spot of the monitoring vehicle can be acquired.

A method for monitoring whether the monitored vehicle is located in the blind spot of the monitoring vehicle is explained more specifically by referring to FIGS. 3 to 6 as below.

Figure 3:
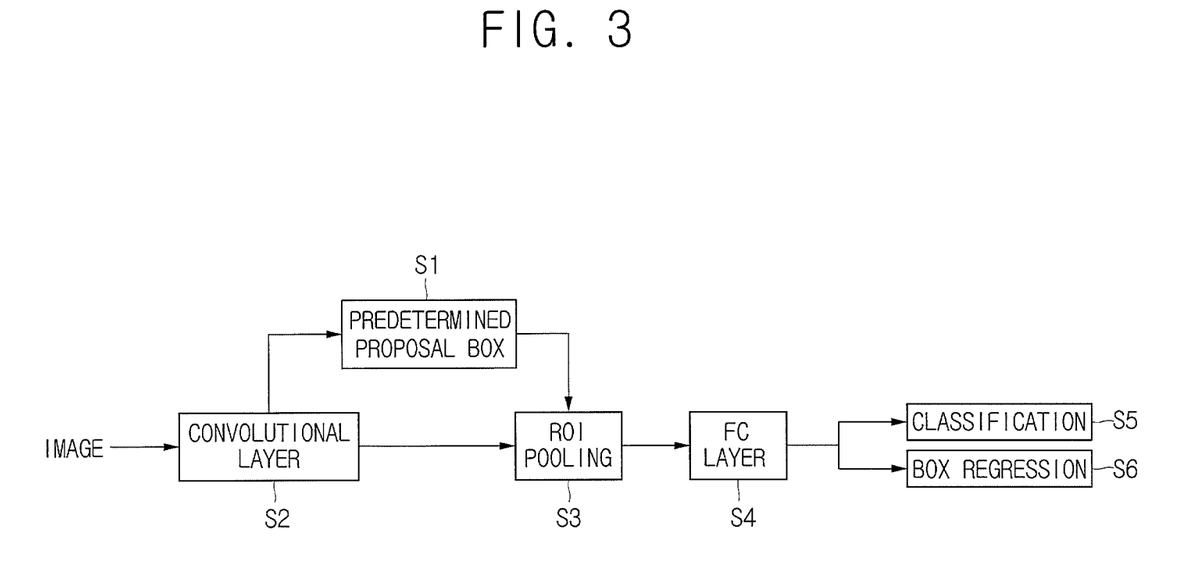
FIG. 3 is a block diagram schematically illustrating a CNN performing blind spot monitoring in accordance with one example embodiment of the present invention.

First, as shown in FIG. 3, the driver sets the m proposal boxes as candidate regions, at the step of S1. Herein, the candidate regions have probabilities, equal to or greater than a predetermined value, of detecting at least one monitored vehicle.

Figure 4:
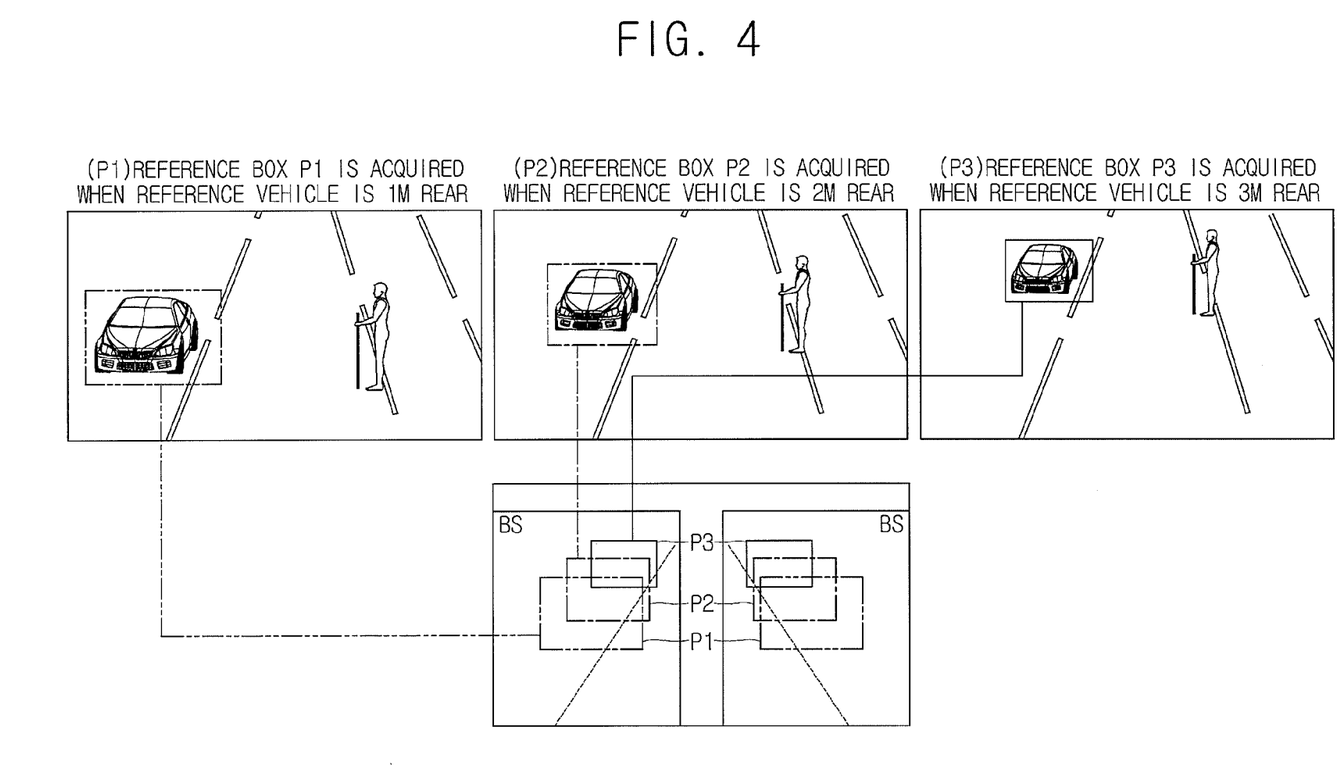
FIG. 4 is a diagram schematically illustrating a process of setting a proposal box for blind spot monitoring using rear video images for sampling, in accordance with one example embodiment of the present invention.

As one example, as shown in FIG. 4, the driver may acquire rear video images for sampling, captured from the monitoring vehicle, with regard to a reference vehicle located per distance in the blind spot of the monitoring vehicle. In other words, the rear video images for sampling may be captured using the vision sensor installed on the monitoring vehicle with the reference vehicle placed in the left and right lanes at one or more unit distances from the monitoring vehicle. Herein, the unit distances are set as one meter in FIG. 4 for convenience, but may be an arbitrary value. The unit distances and the number of capturing an image of the reference vehicle may be varied so that all of probable candidate regions are covered in the blind spots.

Then, each of reference boxes P1, P2, and P3 may be created to be corresponding respectively to the each reference vehicle in the rear video images for sampling captured with the each reference vehicle at each distance, and the created reference boxes P1, P2, and P3 may be set as the m proposal boxes P1, P2, and P3 that serve as the candidate regions. From FIG. 3 to FIG. 6, a value of m is set as three for convenience.

Herein, blind spots are present at each left and right side of the monitoring vehicle, therefore, the whole set of proposal boxes needed for monitoring both of the blind spots on two sides of the monitoring vehicle may be set, by setting equivalents of the m proposal boxes P1, P2, and P3 on one side as other proposal boxes in a blind spot on the other side.

Figure 5:
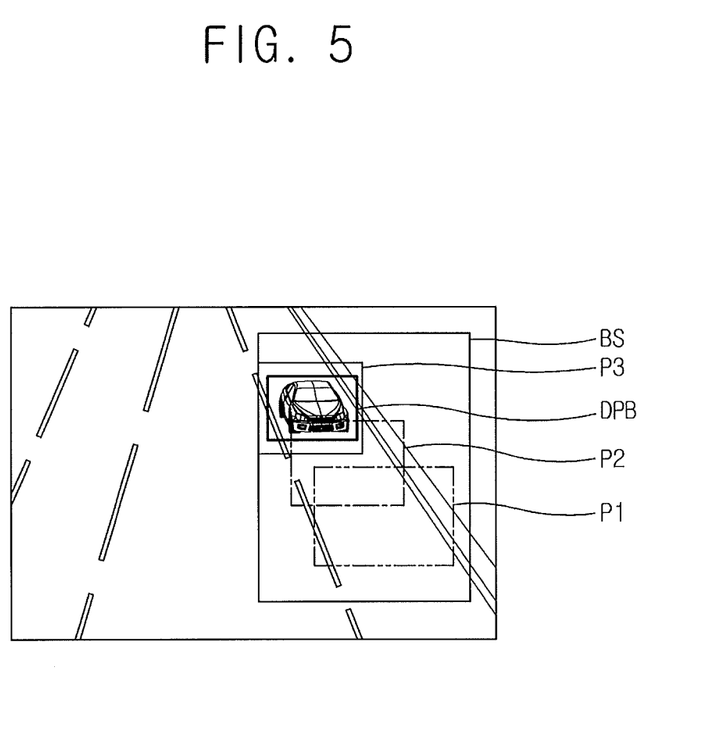
FIG. 5 is a diagram schematically illustrating a process of performing blind spot monitoring in accordance with one example embodiment of the present invention.

Next, on condition that the m proposal boxes P1, P2, and P3 as the candidate regions are set as in FIG. 4, if the rear video images captured from the monitoring vehicle are acquired via the communication part 110 while the monitoring vehicle is in operation, i.e., being driven, as in FIG. 5, the blind spot monitor 100 may acquire the feature map from the rear video images, at the step of S2 in FIG. 3.

As one example, while the monitoring vehicle is in operation, if the vision sensor 10 captures and transmits the rear video images of the monitoring vehicle, the communication part 110 may acquire the rear video images transmitted from the vision sensor 10, and the processor 120 may input the rear video images into a convolutional layer and acquire the feature map by applying convolution operation to the rear video images.

Herein, the processor 120, on condition that a pad is set at zero, may apply convolution operation to the rear video images or to the feature map created from the rear video images, with a filter being slid at a predetermined stride. Herein, the pad is used for adjusting output size from the convolutional layer and the stride is an amount by which the filter shifts. In other words, the processor 120 may apply convolution operation to the rear video images to reduce their sizes and may perform multiple convolution operations to acquire the feature map with a predetermined size. As opposed to this, the processor 120, on condition that convolution is being performed with the pad set at a certain non-zero value, may perform processes of (i) acquiring a feature map with a size identical to that of the rear video images, (ii) downsizing the feature map by applying pooling operation to the acquired feature map, and (iii) creating a feature map with the predetermined size by repeating convolution and pooling.

Further, the processor 120 may perform convolution using a convolutional layer over the whole area of each of the rear video images acquired from the vision sensor 10 or over parts of images corresponding to areas set as the blind spots in the rear video images, and thus acquire the feature map.

Next, the processor 120 may apply pooling operation to areas corresponding to the m proposal boxes P1, P2, and P3 on the feature map at the step of S3, and may acquire the feature vectors corresponding to each of the m proposal boxes.

As one example, the processor 120 may perform processes of (i) inputting parts of the feature maps corresponding to each of the m proposal boxes P1, P2, and P3 among the feature maps into an ROI pooling layer, (ii) performing max pooling or average pooling on each area, of the feature map, corresponding to the m proposal boxes P1, P2, . . . , Pm, and (iii) acquiring each of the feature vectors corresponding to each of the m proposal boxes P1, P2, and P3.

Next, the processor 120 may perform processes of (i) inputting each of the feature vectors corresponding to each of the m proposal boxes P1, P2, and P3 into at least one fully connected (FC) layer at the step of S4, (ii) acquiring classification scores for each class, corresponding to each of the in proposal boxes P1, P2, and P3 from a first FC layer, and (iii) acquiring regression information for each class, corresponding to each of the in proposal boxes P1, P2, and P3, from a second FC layer. Herein, the class may be used for determining what the detected object is, or for determining whether the detected object is a vehicle or not.

Next, the processor 120 may determine the j proposal boxes as including the monitored vehicle among the m proposal boxes P1, P2, and P3 by referring to the classification scores for each class acquired from the first FC layer, at the step of S5.

Next, the processor 120 may acquire the bounding boxes corresponding to each of the j proposal boxes determined as including the monitored vehicle by using each piece of the regression information corresponding to each of the j proposal boxes, at the step of S6.

As one example, the processor 120 of the blind spot monitor 100 may select class-specific regression information, corresponding to a class designated as a vehicle, among a part of the regression information corresponding to one of the j proposal boxes and may acquire a bounding box circumscribing the monitored vehicle by regressing the specific proposal box using the class-specific regression information.

Next, the processor 120 may perform processes of (i) determining whether each of the bounding boxes matches each of the corresponding proposal boxes among the j proposal boxes to a degree equal to or greater than the first threshold, (ii) determining whether the monitored vehicle is located in at least one proposal box among the j proposal boxes, and (iii) determining whether the monitored vehicle is located in the blind spots of the monitoring vehicle.

On the other hand, the processor 120, if at least one specific bounding box that matches its corresponding proposal box among the j proposal boxes to a degree less than a second threshold is determined as detected, may set the specific bounding box as at least one dynamic proposal box, as shown in a DPB (dynamic proposal box) in FIG. 5, which is added as a new element of a group including the candidate regions, to thereby acquire an updated group. Herein, the first threshold and the second threshold may be same with or different from each other. By using the added dynamic proposal box in addition to the m proposal boxes P1, P2, and P3 on a next frame of a subject image, the blind spot monitor 100 may track the specific monitored vehicle.

Figure 6:
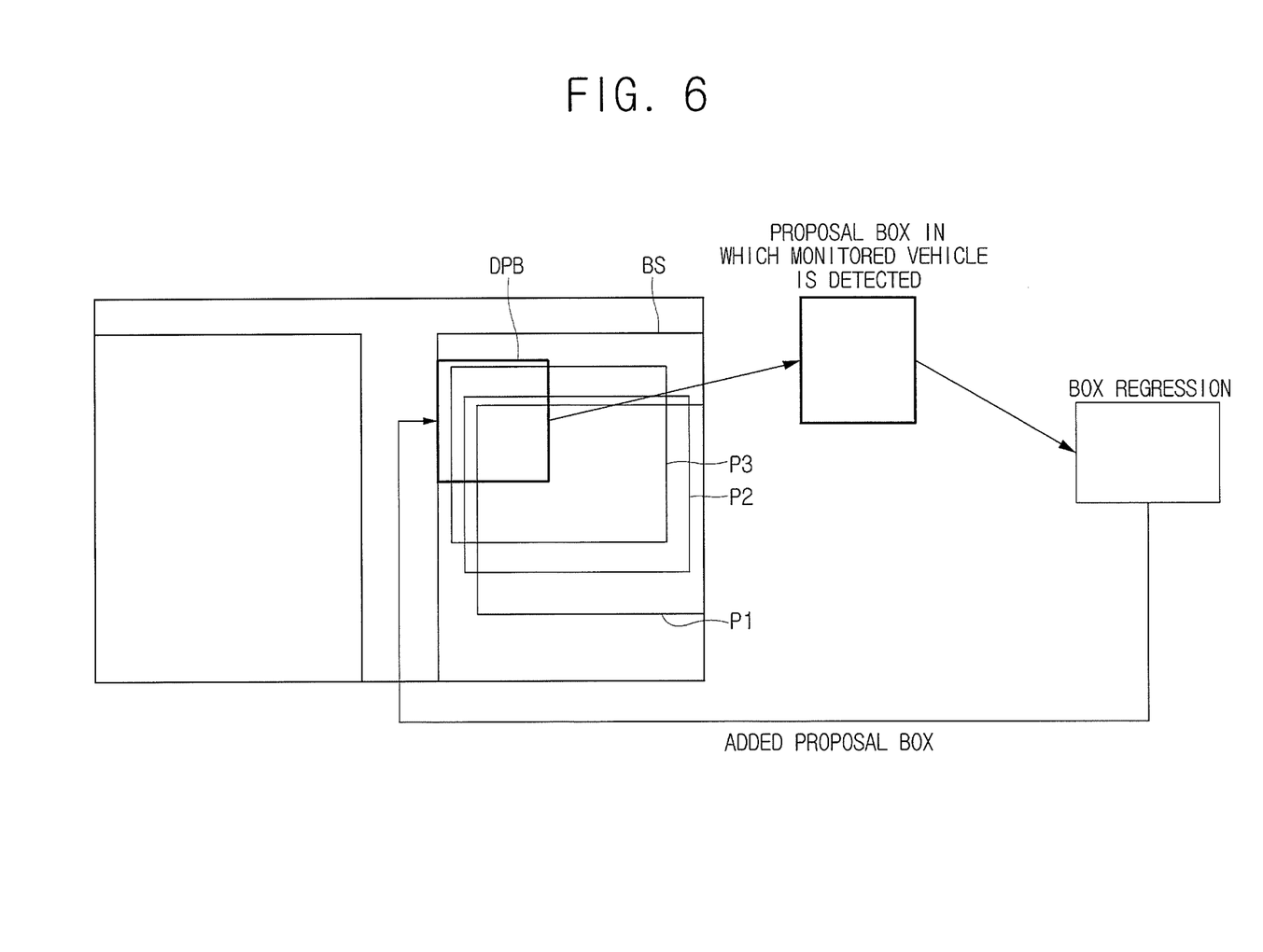
FIG. 6 is a diagram schematically illustrating a process of adding a dynamic proposal box for blind spot monitoring in accordance with one example embodiment of the present invention.

For example, by referring to FIG. 6, if the specific bounding box, i.e., the DPB, is acquired from a t frame of the rear video images, the processor 120 may set the dynamic proposal box and the m proposal boxes P1, P2, and P3 as being included in the updated group on a t+1 frame of the rear video images.

Further, if all of conditions that (i) the dynamic proposal box and the m proposal boxes P1, P2, and P3 are set as the candidate regions as above, (ii) the monitored vehicle is determined as located in the dynamic proposal box from a t+1 frame to a t+(k−1) frame, and (iii) the monitored vehicle is determined as not located in the dynamic proposal box on a t+k frame, are satisfied then the processor 120 may determine whether the monitored vehicle is located in the blind spots by using the m proposal boxes P1, P2, and P3 on a t+k+1 frame.

Herein, the processor 120 may perform processes of (i) calculating first overlapping areas which include areas where each of the bounding boxes and its corresponding j proposal boxes overlap each other, and (ii) determining a certain proposal box, corresponding to a specific first overlapping area among the first overlapping areas that is equal to or greater than a third threshold, as including the monitored vehicle. Herein, the bounding boxes have bijective correspondence to the j proposal boxes. As one example, if a certain bounding box corresponding to a particular proposal box is acquired, the processor 120 may calculate a first overlap ratio between the certain bounding box and the particular proposal box, i.e., a ratio acquired by dividing (i) the area where the certain bounding box overlaps the particular proposal box by (ii) the union of the area of the certain bounding box and the area of the particular proposal box, and if the first overlap ratio is equal to or greater than the third threshold, may determine the particular proposal box as including the monitored vehicle.

Further, the processor 120 may perform processes of (i) calculating second overlapping areas where the bounding boxes, each corresponding to each of the j proposal boxes, overlap each other, (ii) determining at least one particular bounding box, corresponding to at least one specific second overlapping area, among the second overlapping areas, confirmed to be equal to or greater than a fourth threshold, as including a single identical monitored vehicle, and (iii) determining a selected bounding box among the particular bounding boxes, having a largest overlapping area with its corresponding proposal box, as including the monitored vehicle. Herein, the bounding boxes have bijective correspondence to the j proposal boxes.

Further, the processor 120 may perform processes of (i) calculating the second overlapping areas, and (ii) determining each of especial bounding boxes, corresponding to each of especial second overlapping areas, among the second overlapping areas, confirmed to be less than a fifth threshold, as including respective monitored vehicles.

As one example, in case a first and a second bounding boxes corresponding respectively to a first and a second proposal boxes are acquired, the processor 120 may calculate a second overlap ratio between the first and the second bounding boxes, i.e., a ratio acquired by dividing (i) the area where the first bounding box overlaps the second bounding box by (ii) the union of the area of the first bounding box and the area of the second bounding box, and if the second overlap ratio is equal to or greater than the fourth threshold, the processor 120 may determine the first bounding box and the second bounding box as including a single identical monitored vehicle, and if the second overlap ratio is less than the fifth threshold, the processor 120 may determine the first bounding box and the second bounding box as including respective monitored vehicles. Herein, the fourth threshold and the fifth threshold may be same with or different from each other. Further, if the first bounding box and the second bounding box are determined as including the single identical monitored vehicle, the processor 120 may compare a third overlap ratio between the first bounding box and the first proposal box with a fourth overlap ratio between the second bounding box and the second proposal box, and if the third overlap ratio is greater than the fourth overlap ratio, may determine the first bounding box as including the monitored vehicle.

Next, the processor 120 may support a control unit of the monitoring vehicle 200 to prevent the monitoring vehicle 200 from changing lanes in a direction to the blind spot where the monitored vehicle is determined as located, by transmitting information on the monitored vehicle located in the blind spot to the control unit.

Herein, in case the driver intends to change lanes and the monitored vehicle is detected as being located in the blind spot on the lane into which the driver intends to move, the control unit of the monitoring vehicle 200 may allow an alarm system to warn the driver of a fact that the monitored vehicle is in the blind spot and may allow the driver to avoid a hazardous situation which may happen by changing lanes, by referring to information on the steering system of the monitoring vehicle 200. Further, if the monitoring vehicle 200 is an autonomous vehicle, the control unit may allow the autonomous vehicle to change lanes safely by referring to information on the driving environment and information on whether the monitored vehicle is located in the blind spot.

In the above, a process of confirmation of the monitored vehicle in the blind spot is explained with respect to a lane on a single side, however, the confirmation thereof in each blind spot on both sides may be performed by following the same steps for the blind spot in the lane on the other side of the monitoring vehicle.

Meanwhile, the blind spot monitor may include a CNN capable of performing operations of the convolution, the classification, and the box regression by using at least one convolution parameter, at least one classification parameter, and at least one box regression parameter adjusted in advance by a learning device.

Herein, the learning device may be identical to, but not limited to, the blind spot monitor. The learning device and the blind spot monitor may be divided into several devices to perform its functions, however, the present specification describes the learning device implemented as a single device for convenience. The learning device in accordance with the present invention may include at least part of the convolutional layer, a region proposal network, and the FC layer, etc. Clearly, similar conditions may apply to the blind spot monitor.

A schematic explanation about how the learning device or the blind spot monitor is learned is as follows:

First, an operation of the convolution is performed over a training image to acquire a feature map for training, the feature map for training is fed into the region proposal network, and proposal boxes for training corresponding to an object located in the training image are acquired. Then, feature vectors for training corresponding to each of the proposal boxes for training by applying pooling operation to the areas on the training image are acquired. Thereafter, the feature vectors for training are fed into at least one FC layer, and classification scores for training for each class, corresponding to each of the proposal boxes for training, are acquired, and box regression information for training for each class, corresponding to each of the proposal boxes for training, are acquired. Then, a classification loss value is acquired by comparing the classification scores and a predetermined ground truth of the classification, a regression loss value is acquired by comparing the box regression information and a predetermined ground truth of the box regression. Then the convolution parameter, the classification parameter, and the box regression parameter are adjusted by backpropagating each of the acquired classification loss value and the acquired regression loss value.

The present invention has an effect of accurately detecting the monitored vehicle located in the blind spots by using the CNN.

The present invention has another effect of accurately detecting the monitored vehicle located in the blind spots without regard to the driving environment of the monitoring vehicle.

The present invention has still another effect of detecting the monitored vehicle located in the blind spots with reduced computational load by performing task-oriented detection using least number of the proposal boxes without exhaustive search for the proposal boxes of every scale and aspect ratio based on prior knowledge of scales of vehicles and aspect ratios confined by areas of the blind spots, as opposed to an RPN of a conventional object detection network which searches exhaustively for the proposal boxes of every scale and aspect ratio.

The present invention has still yet another effect of detecting the monitored vehicle located in the blind spots in real-time by less computation without regard to a change of a state of a background and a visual noise.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method of monitoring a blind spot of a monitoring vehicle by using a blind spot monitor, comprising steps of:
   (a) the blind spot monitor, if rear video images for testing are acquired from the monitoring vehicle in operation, acquiring or supporting another device to acquire at least one feature map for testing from the rear video images for testing, on condition that the blind spot monitor completes or supports another device to complete (i) a process of acquiring rear video images for sampling with regard to one or more reference vehicles located per distance from the monitoring vehicle and located in the blind spot of the monitoring vehicle, (ii) a process of creating reference boxes corresponding to the reference vehicles in each of the rear video images for sampling, and (iii) a process of setting the reference boxes as m proposal boxes which serve as candidate regions in the blind spot of the monitoring vehicle, wherein the candidate regions have probabilities of detecting at least one monitored vehicle;
   (b) the blind spot monitor (i) acquiring or supporting another device to acquire each of feature vectors for testing corresponding to each of the m proposal boxes by applying pooling operation to the m proposal boxes on the feature map for testing, (ii) inputting or supporting another device to input the feature vectors for testing into at least one fully connected layer, (iii) acquiring or supporting another device to acquire classification scores for testing for each class, corresponding to each of the m proposal boxes, and (iv) acquiring or supporting another device to acquire regression information for testing for each class, corresponding to each of the m proposal boxes; and
   (c) the blind spot monitor performing or supporting another device to perform (i) a process of selecting j proposal boxes among the m proposal boxes by referring to the classification scores for testing, (ii) a process of acquiring each of bounding boxes corresponding to each of the j proposal boxes by using the regression information for testing corresponding to each of the j proposal boxes, (iii) a process of confirming whether each of the bounding boxes matches its corresponding proposal box among the j proposal boxes to a degree equal to or greater than a first threshold, and (iv) a process of determining whether the monitored vehicle is located in any of the j proposal boxes, to thereby determine whether the monitored vehicle is located in the blind spot of the monitoring vehicle.

2. The method of claim 1, further comprising a step of:
   (d) the blind spot monitor, if at least one specific bounding box that matches its corresponding proposal box among the j proposal boxes to a degree less than a second threshold is determined as found, setting or supporting another device to set the specific bounding box as at least one dynamic proposal box which is added as a new element of a group including the candidate regions, to thereby acquire an updated group.

3. The method of claim 2, wherein, at the step of (d), if the specific bounding box is acquired from a t frame of the rear video images for testing, the blind spot monitor sets or supports another device to set the dynamic proposal box and the m proposal boxes as being included in the updated group in a t+1 frame of the rear video images for testing.

4. The method of claim 3, wherein the blind spot monitor determines or supports another device to determine whether the monitored vehicle is located in the m proposal boxes on a t+k+1 frame, on condition that (i) the monitored vehicle is determined as located in the dynamic proposal box from a t+1 frame to a t+(k−1) frame, and (ii) the monitored vehicle is determined as not located in the dynamic proposal box on a t+k frame.

5. The method of claim 1, further comprising a step of:
   (e) the blind spot monitor supporting a control unit to prevent the monitoring vehicle from changing lanes in a direction to the blind spot where the monitored vehicle is determined as located by transmitting information on the monitored vehicle located in the blind spot to the control unit.

6. The method of claim 1, wherein, at the step of (c), the blind spot monitor (i) calculates or supports another device to calculate first overlapping areas where each of the bounding boxes and its corresponding j proposal boxes overlap each other, and (ii) determines or supports another device to determine a certain proposal box, corresponding to a specific first overlapping area among the first overlapping areas that is equal to or greater than a third threshold, as including the monitored vehicle.

7. The method of claim 1, wherein, at the step of (c), the blind spot monitor (i) calculates or supports another device to calculate second overlapping areas where the bounding boxes, each of which corresponds to each of the j proposal boxes, overlap each other, (ii) determines or supports another device to determine at least one particular bounding box, corresponding to at least one specific second overlapping area, among the second overlapping areas, confirmed to be equal to or greater than a fourth threshold, as including a single identical monitored vehicle, and (iii) determines or supports another device to determine a selected bounding box among the particular bounding box, having a largest overlapping area with its corresponding proposal box, as including the monitored vehicle.

8. The method of claim 1, wherein, at the step of (c), the blind spot monitor (i) calculates or supports another device to calculate second overlapping areas where the bounding boxes, each of which corresponds to each of the j proposal boxes, overlap each other, (ii) determines or supports another device to determine especial bounding boxes, corresponding to specific second overlapping areas, among the second overlapping areas, confirmed to be less than a fifth threshold, as including respective monitored vehicles, and (iii) determines or supports another device to determine the especial bounding boxes as including the respective monitored vehicles.

9. The method of claim 1, wherein, at the step of (a), the blind spot monitor, on condition that a pad is set at zero, performs or supports another device to perform applying convolution operation to the rear video images for testing or to the feature map for testing acquired by using the rear video images, with a filter being slid at a predetermined stride.

10. The method of claim 1, wherein, at the step of (a), the blind spot monitor acquires or supports another device to acquire the feature map for testing by applying convolution operation to a subject image corresponding to the blind spot in the rear video images for testing.

11. The method of claim 1, wherein the blind spot monitor performs convolution, classification, and box regression by using at least one convolution parameter, at least one classification parameter, and at least one box regression parameter having been adjusted by a learning device, and
wherein the learning device performs or supports another device to perform
(i) a process of acquiring feature maps for training by applying convolution operation to training images, a process of inputting the feature maps for training into a region proposal network, and a process of acquiring proposal boxes for training corresponding to objects located in the training images, (ii) a process of acquiring each of feature vectors for training corresponding to each of the proposal boxes for training by applying pooling operation to areas of the training images corresponding to the proposal boxes for training, a process of inputting the feature vectors for training into each of the fully connected layers, and a process of acquiring classification scores for training for each class, corresponding to each of the proposal boxes for training, and regression information for training for each class, corresponding to each of the proposal boxes for training, and (iii) a process of acquiring a classification loss value by comparing the classification scores and a predetermined ground truth of the classification, a process of acquiring a regression loss value by comparing the regression information and a predetermined ground truth of the box regression, and a process of learning the convolution parameter, the classification parameter, and the box regression parameter by back-propagating each of the acquired classification loss value and the acquired regression loss value.

12. A blind spot monitor for monitoring a blind spot of a monitoring vehicle, comprising:
a communication part for acquiring or supporting another device to acquire rear video images for testing from the monitoring vehicle in operation, on condition that rear video images for sampling taken from the monitoring vehicle with regard to one or more reference vehicles located per distance from the monitoring vehicle and located in the blind spot of the monitoring vehicle are acquired, that reference boxes corresponding to the reference vehicles in each of the rear video images for sampling are created, and that the reference boxes are set as m proposal boxes which serve as candidate regions in the blind spot of the monitoring vehicle, wherein the candidate regions have probabilities of detecting at least one monitored vehicle; and
a processor for performing or supporting another device to perform (i) a process of acquiring at least one feature map for testing from the rear video images for testing; (ii) a process of acquiring each of feature vectors for testing corresponding to each of the m proposal boxes by applying pooling operation to each of areas corresponding to the m proposal boxes on the feature map for testing, a process of inputting each of the feature vectors for testing corresponding to each of the m proposal boxes into at least one fully connected layer, and (ii-1) a process of acquiring classification scores for testing for each class, corresponding to each of the m proposal boxes, (ii-2) a process of acquiring regression information for testing for each class, corresponding to each of the m proposal boxes; and (iii) a process of selecting j proposal boxes among the m proposal boxes by referring to the classification scores for testing, a process of acquiring bounding boxes each of which is corresponding to each of the j proposal boxes by using the regression information for testing corresponding to each of the j proposal boxes, a process of confirming whether each of the bounding boxes matches its corresponding proposal box among the j proposal boxes to a degree equal to or greater than a first threshold, and a process of determining whether the monitored vehicle is located in any of the j proposal boxes, to thereby determine whether the monitored vehicle is located in the blind spot of the monitoring vehicle.

13. The blind spot monitor of claim 12, further comprising a process of:
(iv) if at least one specific bounding box that matches its corresponding proposal box among the j proposal boxes to a degree less than a second threshold is determined as found, setting the specific bounding box as at least one dynamic proposal box which is added as a new element of a group including the candidate regions, to thereby acquire an updated group.

14. The blind spot monitor of claim 13, wherein, if the specific bounding box is acquired from a t frame of the rear video images for testing, the processor sets or supports another device to set the dynamic proposal box and the m proposal boxes as being included in the updated group in a t+1 frame of the rear video images for testing.

15. The blind spot monitor of claim 14, wherein the processor determines or supports another device to determine whether the monitored vehicle is located in the m proposal boxes on a t+k+1 frame, on condition that the monitored vehicle is determined as located in the dynamic proposal box from a t+1 frame to a t+(k−1) frame, and that the monitored vehicle is determined as not located in the dynamic proposal box on a t+k frame.

16. The blind spot monitor of claim 12, further comprising a process of:
(v) supporting a control unit to prevent the monitoring vehicle from changing lanes in a direction to the blind spot where the monitored vehicle is determined as located by transmitting information on the monitored vehicle located in the blind spot to the control unit.

17. The blind spot monitor of claim 12, wherein, at the process of (iii), the processor calculates first overlapping areas where each of the bounding boxes and its corresponding j proposal boxes overlap each other, and determines a certain proposal box, corresponding to a specific first overlapping area among the first overlapping areas that is equal to or greater than a third threshold, as including the monitored vehicle.

18. The blind spot monitor of claim 12, wherein, at the process of (iii), the processor calculates second overlapping areas where the bounding boxes, each of which is corresponding to each of the j proposal boxes, overlap each other, determines at least one particular bounding box, corresponding to at least one specific second overlapping area, among the second overlapping areas, confirmed to be equal to or greater than a fourth threshold, as including a single identical monitored vehicle, and determines a selected bounding box among the particular bounding box, having a largest overlapping area with its corresponding proposal box, as including the monitored vehicle.

19. The blind spot monitor of claim 12, wherein, at the process of (iii), the processor calculates second overlapping areas where the bounding boxes, each of which is corresponding to each of the j proposal boxes, overlap each other, determines especial bounding boxes, corresponding to specific second overlapping areas, among the second overlapping areas, confirmed to be less than a fifth threshold, as including respective monitored vehicles, and determines the especial bounding boxes as including the respective monitored vehicles.

20. The blind spot monitor of claim 12, wherein, at the process of (i), on condition that a pad is set at zero, the processor applies convolution operation to the rear video images for testing or to the feature map for testing acquired by using the rear video images, with a filter being slid at a predetermined stride.

21. The blind spot monitor of claim 12, wherein, at the process of (i), the processor acquires the feature map for testing by applying convolution operation to a subject image corresponding to the blind spot in the rear video images for testing.

22. The blind spot monitor of claim 12, wherein the processor performs or supports another device to perform convolution, classification, and box regression by using at least one convolution parameter, at least one classification parameter, and at least one box regression parameter having learned by a learning device, and wherein the learning device performs or supports another device to perform (a) a process of acquiring feature maps for training by applying convolution operation to training images, a process of inputting the feature maps for training into a region proposal network, and a process of acquiring proposal boxes for training corresponding to objects located in the training images, (b) a process of acquiring each of feature vectors for training corresponding to each of the proposal boxes for training by applying pooling operation to areas of the training images corresponding to the proposal boxes for training, a process of inputting the feature vectors for training into each of the fully connected layers, and a process of acquiring classification scores for training for each class, corresponding to each of the proposal boxes for training, and regression information for training for each class, corresponding to each of the proposal boxes for training, and (c) a process of acquiring a classification loss value by comparing the classification scores and a predetermined ground truth of the classification, acquiring a regression loss value by comparing the regression information and a predetermined ground truth of the box regression, and learning the convolution parameter, the classification parameter, and the box regression parameter by backpropagating each of the acquired classification loss value and the acquired regression loss value.

* * * * *